United States Patent [19]

Dill

[11] 4,008,902
[45] Feb. 22, 1977

[54] STOCK TRAILER

[75] Inventor: Terry A. Dill, Keota, Iowa

[73] Assignee: Fairfield Engineering and Manufacturing Company, Fairfield, Iowa

[22] Filed: Jan. 29, 1976

[21] Appl. No.: 653,297

[52] U.S. Cl. .................. 280/43.23; 280/43.24; 280/490 R

[51] Int. Cl.² .................................. B62D 33/08

[58] Field of Search ......... 280/43.17, 43.19, 43.23, 280/43.24, 490 R, 414 R

[56] References Cited

UNITED STATES PATENTS

| | | | |
|---|---|---|---|
| 3,062,558 | 11/1962 | Krolicki | 280/43.23 |
| 3,536,339 | 10/1970 | Fichtenberg | 280/43.23 |
| 3,635,492 | 1/1972 | Mauldin | 280/43.23 |
| 3,711,110 | 1/1973 | Logerquist | 280/43.24 |
| 3,876,222 | 4/1975 | Thorsell | 280/43.19 |

Primary Examiner—Robert R. Song
Attorney, Agent, or Firm—Rudolph L. Lowell

[57] ABSTRACT

A tractor towed stock trailer having a stock carrying platform which may be lowered directly onto the ground for loading and unloading stock and raised to a stock carrying position for transport. A pair of upstanding side plates are pivotally supported at opposite sides of the platform, each having a wheel carried on a lower end thereof, and pivotable as a unit structure about a common transverse axis secured to the side plates adjacent the upper ends thereof. Each side plate is of a triangular shape and, when the platform is in a lowered position therefor, has the apex portion between the upper and lower ends thereof in ground engagement. A linearly extendible and retractable power unit is connected to the platform and to each pivoted side plate such that upon initial extension of the power unit to raise the platform from its lowered position on the ground, an efficient lifting leverage is obtained by the initial fulcrum action of the ground engaged apex portion followed by the fulcrum action of the ground wheels.

6 Claims, 7 Drawing Figures

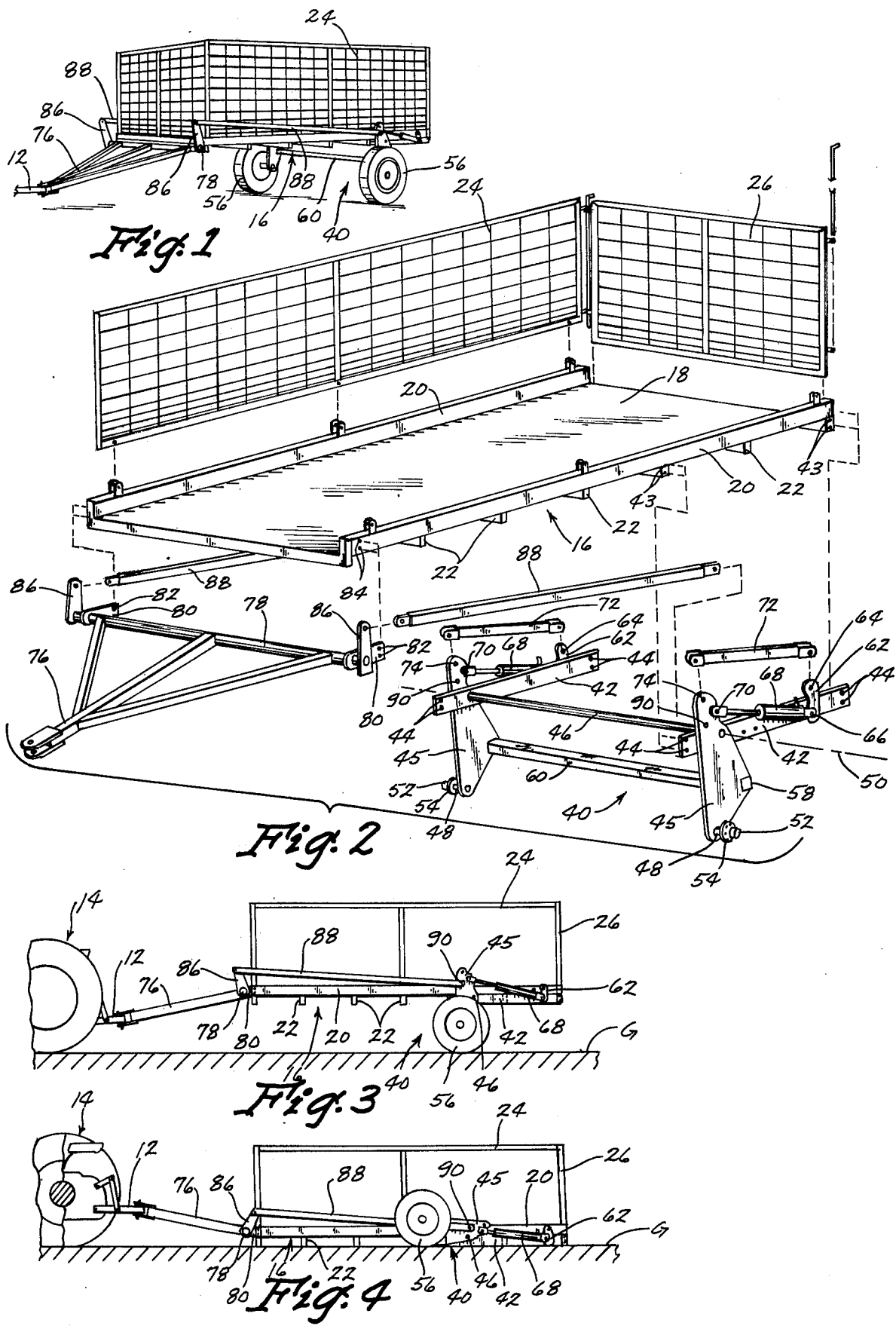

STOCK TRAILER

BACKGROUND AND SUMMARY OF THE INVENTION

This invention relates in general to farm implements, and more specifically, to a stock carrying trailer adapted to be pulled behind a farm tractor and capable of being efficiently lowered and raised for loading and transporting stock.

Various types of vehicles have been used by farmers in the past to transport stock from one location to another. A particular problem associated with the use of such prior vehicles is the difficulty of loading stock onto them. Specifically, some type of ramp or substantial step must be climbed by the stock upon entering the trailer or other such vehicle. The resistance of stock to overcoming such obstacles is well known. Instead, they tend to avoid such obstacles by simply walking around them or stopping in front of them and refusing to advance further.

Accordingly, it is an object of the present invention to provide a tractor pulled stock trailer, the platform of which may be lowered directly onto the ground for loading the stock so as to substantially eliminate any obstacle to stock entry and exit relative to the platform.

Another object of the present invention is a stock trailer of rugged construction and one to which known leveling mechanisms are adaptable.

Another object of the present invention is a stock trailer having a lifting mechanism which may be attached to the platform as a unit structure and pivoted relative to the platform to allow the same to rest directly on the ground in its lowered stock-loading position.

Another object of the present invention is a stock trailer having a lifting mechanism which provides an efficient leverage for initially lifting the trailer off of the ground.

The stock trailer of the present invention is simply and ruggedly constructed, adapted for quick and easy attachment to and detachment from a towing vehicle and easily operable to load and transport stock. The trailer has a stock-carrying platform with a pair of upstanding side plates or lift arms pivotally supported at opposite sides of the platform for pivotal movement longitudinally of the platform about a common transverse axis. The side plates are triangular, each having a lower apex on which a wheel is rotatably carried, an upper apex for a common pivot member and an intermediate apex which functions as a ground supported fulcrum when the platform is in a lowered stock-loading position resting directly on the ground. The side plates are thus utilized to improve the initial lifting leverage.

BRIEF DESCRIPTION OF THE DRAWINGS

FIG. 1 is a perspective view of the stock trailer of this invention shown in assembly relation with the draw bar of a tractor;

FIG. 2 is an exploded perspective view of the trailer frame assembly shown in FIG. 1;

FIG. 3 is a side view of the assembly in FIG. 1 showing the stock trailer in the raised stock-carrying position;

FIG. 4 is illustrated similarly to FIG. 3 and shows the stock trailer in the lowered stock-loading position;

DETAILED DESCRIPTION OF THE INVENTION

Figure 5:
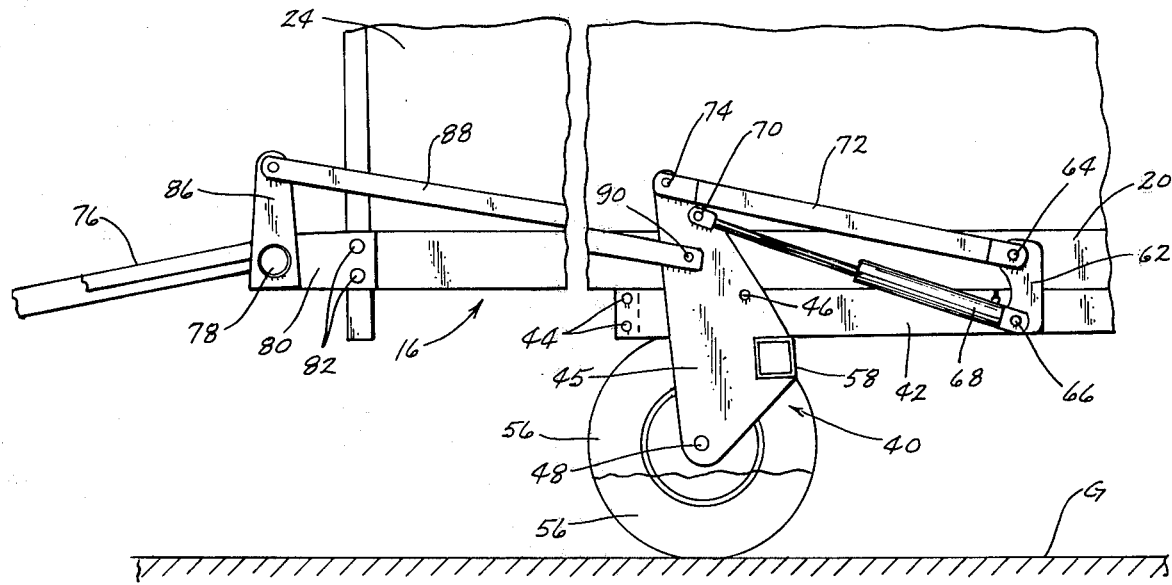
FIG. 5 is an enlarged, foreshortened side view of the stock trailer shown in the raised stock-carrying position.

The stock trailer of this invention, indicated generally at 10, is shown in FIGS. 1-6, inclusive, attached to the usual draw bar 12 of a farm tractor vehicle 14 (FIGS. 3 and 4). The stock trailer includes a portable frame that has a substantially flat platform, indicated generally at 16 (FIG. 2). In the preferred embodiment, the platform 16 consists of a floor plate 18 positioned between a pair of longitudinal side members 20 and underlying transverse cross members 22. The side members 20 and cross members 22 may be welded or otherwise rigidly connected to the floor plate 18 to form a solid unitary platform member. Both the side members 20 and cross members 22 are preferably tubular members having closed ends to exclude moisture and dirt. There are no front or rear upper members corresponding to side members 20, thereby facilitating flushing and cleaning of the platform surface.

Mounted on the platform are opposed removable side panels 24 and end panels 26. The panels are suitably fastened to the platform side members 20 and to one another for upright support. Rear panel 26 is hinged at one or both sides to the side panels 24 so as to function as a gate for loading and unloading stock.

In order to raise and lower the platform for transporting and loading stock, a pivoted lift frame assembly, indicated generally at 40 in FIG. 2, is provided. In the preferred embodiment, the pivoted lift frame assembly 40 includes a pair of mounting plates 42 extended longitudinally of the platform 16 and attachable to the closed ends 43 of selected rear cross members 22, as indicated in FIG. 2. Attachment may be accomplished by the insertion of bolts through aligned holes 44 and 46 in the mounting plates 42 and cross member ends 43, respectively.

A pair of upstanding side plates or lift arms 45 are situated at opposite sides of the platform 16 adjacent the mounting plates 42. The side plates 45 are supported on a pivot shaft 46 carried on the mounting plates 42 for pivotal movement of the side plates longitudinally of the platform about a common transverse axis 50. With the pivoted lift frame assembly 40 assembled with the platform 16, pivot shaft 46 extends transversely across the platform below floor plate 18 and between adjacent ones of the cross members 22. A short stub shaft 52 extends outwardly from the lower end 48 of each side plate 45 and carries a wheel hub 54 on which a ground wheel 56 (FIGS. 1, 5 and 6) is rotatably supported.

The side plates 45, in the preferred embodiment, are of a triangular shape. Accordingly, a central apex or shoulder 58 protrudes rearwardly of the upper and lower ends of the side plates 45 as shown in FIGS. 2 and 5, the apex 58 being positioned rearwardly of a line drawn between the wheel shaft 52 and the pivot shaft 46. A square reinforcing shaft 60 is rigidly connected to and between the apexes 58 of the side plates 45 to thereby rigidify the pivoted lift frame assembly 40 by restraining lateral movement of the lower ends 48 of the side plates 45.

A bracket 62 is affixed to each mounting plate 42 rearwardly of the pivot shaft 46. In the preferred form shown, each bracket 62 extends above and below the mounting plate 42 to which it is welded in order to expose a pair of holes 64 and 66 for a purpose described below.

Figure 6:
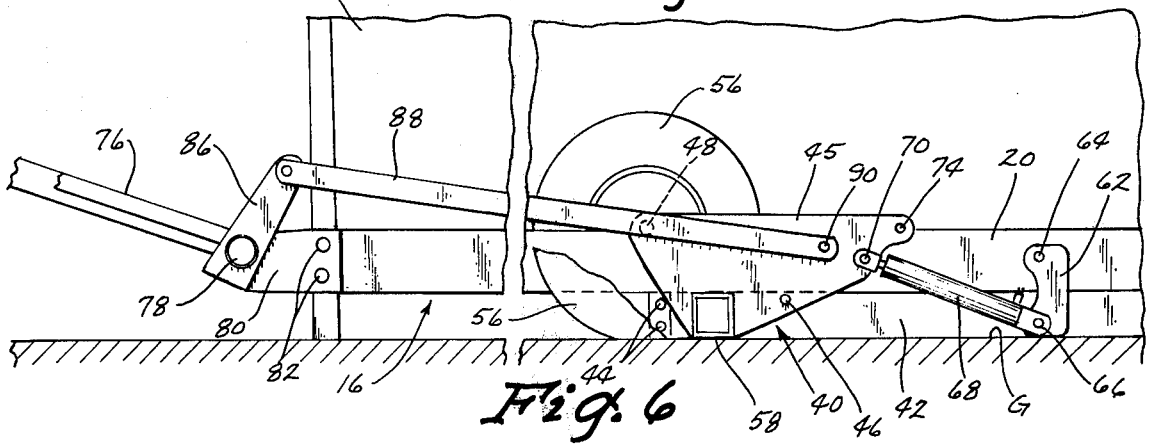
FIG. 6 is illustrated similarly to FIG. 5 and shows the stock trailer in the lowered stock-loading position.

The source of power for pivoting the side plates or pivot arms 45 on pivot shaft 46 is provided by a pair of linearly extendible and retractable power units such as the hydraulic cylinders 68 (FIGS. 2, 5 and 6). A rear end of each hydraulic cylinder is pivotally attached by a usual clevis to the platform at a hole 66 in bracket 62. The front end is likewise pivotally connected by a usual clevis structure to a side plate 45 by a pivot 70 located above pivot shaft 46. On extension of the hydraulic cylinders 68 the pivot connection 70 is moved away from bracket 62 thereby causing the downward pivotal movement of the lower end 48 of each side plate 45, and providing for a raising of the platform 16 to its raised stock-carrying position, as shown in FIG. 5. Similarly, retraction of hydraulic cylinders 68 allows the weight of the platform 18 to pivotally move the side plates 45 in a clockwise direction from the position of FIG. 5 to that of FIG. 6, thereby allowing platform 16 to come to rest on the ground G in its lowered stock-loading position. In this latter position, the apexes 58 of the side plates 45 and the connecting shaft 60 bear against the ground, the pivot shaft 46 is adjacent the underside of the floor plate 18 and the lower end 48 of each side plate 45 is pivoted upwardly a sufficient distance to raise wheels 56 slightly off the ground.

In the raised stock-carrying position of FIG. 5, the weight of the platform 16 tends to rotate the side plates 45 clockwise toward the lowered position of FIG. 6. As a safety precaution during transport, a lock arm 72 is connected to the upper end of a side plate 45 and adjacent bracket 64 by the insertion of bolts at holes 74 and 64, respectively. Thus, after the hydraulic cylinders have been extended to effectively raise the platform 16 to its raised stock-carrying position, the lock arms 72 are connected and the load on the hydraulic cylinders 68 may be relieved.

In order to maintain platform 16 generally parallel to the ground level at all moved positions therefor and to assist in the raising of the platform, there is provided a generally conventional bell crank type connection between the tractor and platform. As shown best in FIG. 2, the tongue 76 is rigidly secured such as by welding or other suitable means to a rock shaft 78 which extends between and is rotatably mounted on side plate extensions 80 that are secured to the side members 20, by bolt assemblies extended through aligned bolt holes 82 and 84. A rock arm 86 is secured to each end of rock shaft 78. Thus, the tongue 76 constitutes one arm of the bell crank and the rock arms 86 the other arm of the bell crank. A rigid tongue linkage 88 pivotally connects each rock arm 86 to an associated side plate 45. As clearly shown in FIGS. 5 and 6, the front end of each tongue linkage 88 is pivotally connected to a side plate 45 as at 90 just above the pivot shaft 46.

In one embodiment of the present invention, the platform is constructed from a six foot by fourteen foot floor plate and two inch by three inch tubular side members 20 and cross members 22, with the latter being arranged on sixteen inch centers spaced longitudinally of the platform. The shaft 60 is constructed from a three inch by three inch tubular member. In the raised stock-carrying position, the platform is elevated about forty two inches.

Operation of the stock trailer 10 of the present invention to load and transport stock thereon is accomplished by first disengaging at least one end of the lock arm 72 to permit retraction of the hydraulic cylinders 68. As the cylinders 68 are allowed to retract, the lift arms 45 rotate clockwise as shown in FIGS. 3–6, thereby pivotally moving the lift arms 45 upwardly relative to the platform 16 to horizontal positions providing for a lowering of the platform to the ground. Just before the platform cross members 22 contact the ground, the apexes 58 of the side plates 45 and the connecting shaft 60 make ground engagement so that the slight additional downward movement of the platform into ground engagement is effective to raise the wheels 56 slightly off the ground. The wheels 56 are thus load-free and/or out of contact with the ground when the platform is in the lowered stock-loading position.

Since the tongue linkage 88 is connected to the side plates 45 just above pivot shaft 46, clockwise pivotal movement of side plates 45 to lower the platform 16 is also effective to change the angular orientation of the tongue member 76 relative to the platform 16. It can thus be seen that regardless of the moved position of the platform 16, the bell crank type connection between the tractor and platform is effective to maintain the platform 16 level with the ground. Similarly, and referring to FIGS. 3 and 4, since the wheels 56 are mounted rearwardly of the longitudinal center of the platform 16, the same bell crank type connection or linkage which levels the platform also serves to support and lift the front end of the platform.

With the platform 16 lowered to its stock-loading position, as shown in FIGS. 4 and 6, the end panel 26 may be swung open. The stock is loaded at the open rear end of the trailer with a minimum of resistance since the platform rests directly on the ground and presents no obstacle to stock entering the enclosed platform. Once the stock is loaded, the end panel 26 is swung closed.

In order to raise the loaded platform, the hydraulic cylinders 68 are extended. The apexes 58 on the side plates 45 are specially formed to provide increased lifting leverage for the hydraulic cylinders 68 as lifting is initiated. Thus, prior to the wheels 56 contacting the ground to support the weight of the platform 16, such weight is borne by the pivot shaft 46, which as shown in FIGS. 2, 5 and 6, is connected to the platform through mounting plates 42, and the apexes 58 and the connecting shaft 60 constitute a fulcrum for the initial pivoted movement of side plates 44. The leverage provided by such a construction is the perpendicular distance between the axes of the pivot shaft 46 and cylinder pivot 70. This lifting leverage is transmitted through the lift arms 45 and linkages 88 to the rock shaft 78, to provide a coacting lifting action at the front end of the platform 16. When the wheels 56 touch the ground to carry the weight of the platform 16, the stub shafts 52 of the wheels become the fulcrums for further pivotal movement of the side plates or lift arms 45 about the axis 50. It is seen, therefore, that the platform 16 is initially moved toward an elevated position by the lifting action of the pivot shaft 46 which is connected to the platform by the mounting plates 42 and the function of the apexes 58 and connecting shaft 60 is as a primary fulcrum for the lift arms 44. With the platform 16 raised to the stock-carrying position, the towing vehicle may be driven in the usual manner to transport the stock to a desired location, at which point the platform may again be lowered as described above to unload the stock.

Figure 7:
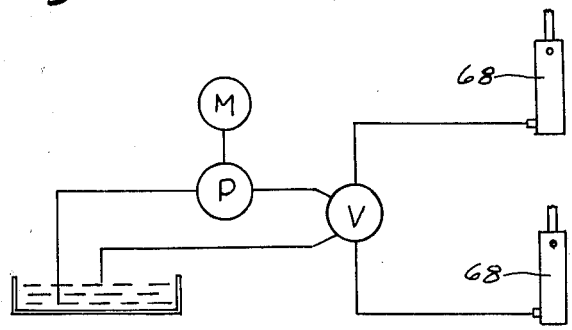
FIG. 7 is a schematic circuit diagram of the control circuit for the hydraulic cylinders of the present invention.

To operate the fluid control circuit for the cylinders 68, the driver of the towing vehicle need only manually regulate the setting of a control valve V, as indicated in FIG. 7, which forms part of the usual hydraulic system of a tractor. The control valve has communication with a reservoir, a hydraulic pump P driven from the tractor engine, indicated at M, and the cylinders 68. The control valve directs the pressurized fluid either to the cylinders 68 or to the reservoir, and in a neutral position holds the cylinders in extended positions.

Although the invention has been described with respect to a preferred embodiment thereof, it is to be understood that it is not to be so limited since changes and modifications can be made therein which are within the full intended scope of the invention as defined by the appended claims.

I claim:
1. A stock trailer towable by a tractor comprising:
 a. a portable frame,
 b. hitch means connecting the front end of the portable frame to the tractor,
 c. a lift frame assembly including a pair of lift arms arranged at opposite sides of the portable frame, each lift arm having a ground engageable portion intermediate the ends thereof,
 d. pivot means supporting the lift arms adjacent one of the ends thereof on said portable frame for pivotal movement about a common axis extended transversely of the portable frame,
 e. a ground wheel rotatably supported at the other end of each lift arm,
 f. levelling means for said portable frame movably interconnected to said hitch means and to said lift arms for levelling movement in response to a pivotal movement of said lift arms, and
 g. means for pivotally moving said lift arms to first positions extended longitudinally of the portable frame wherein the portable frame rests on the ground, said ground engageable portions are in ground engagement, and said ground wheels are without load so that on initial pivotal movement of the lift arms to second upright positions therefor an upward movement of the portable frame is initiated by the lifting action applied at said pivot means by the fulcrum support of the lift arms on said ground engageable portions.

2. The stock trailer according to claim 1 wherein:
 a. said lift means comprises a pair of hydraulic cylinder assemblies corresponding to said lift arms, each hydraulic cylinder assembly having one end connected to said portable frame and an opposite end to an associated lift arm at said one end thereof.

3. The stock trailer according to claim 2 wherein:
 a. said portable frame includes a flat floor member,
 b. transverse brace members spaced longitudinally of and secured to the underside of said floor member, and
 c. a connecting shaft extended between and rigidly secured to said ground engageable portions, said connecting member, when the lift arms are in the first positions therefor, being located between and within the vertical confines of adjacent transverse brace members, and coacting with said ground engageable portions to provide the fulcrum support for said lift arms in the initial lifting of the portable frame.

4. The stock trailer according to claim 2 wherein:
 a. each of said lift arms is of an elongated triangular shape with the common axis extended through one apex, ground wheel rotatably supported at a second apex and ground engageable portion constituting a third apex.

5. The stock trailer according to claim 2 wherein:
 a. said pivot means comprises an elongated pivot shaft extended transversely of the portable frame and connected at each end to said one end of a respective one of the lift arms, said pivot shaft connected to and carried on said portable frame.

6. The stock trailer according to claim 5 wherein:
 a. the pivot shaft, when the lift arms are in the first positions therefor, being situated between adjacent transverse brace members.

* * * * *